S. STEVENS.
Bee Hive.

No. 64,806. Patented May 14, 1867.

WITNESSES:
Joel Harris
John Shrop

INVENTOR:
Solomon Stevens

United States Patent Office.

SOLOMON STEVENS, OF NEW CARLISLE, INDIANA.

Letters Patent No. 64,806, dated May 14, 1867.

IMPROVEMENT IN BEE-HIVES.

*The Schedule referred to in these Letters Patent and making part of the same.*

TO ALL WHOM IT MAY CONCERN:

Be it known that I, SOLOMON STEVENS, of New Carlisle, in the county of St. Joseph, and State of Indiana, have invented a new and useful Improvement on Bee-Hives; and I do hereby declare that the following is a full, clear, and exact description thereof, reference being had to the annexed drawings, making a part of this specification, in which—

Figure 1:
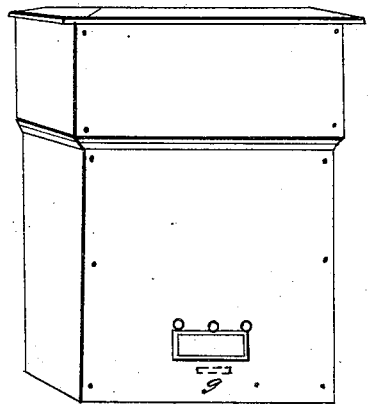

Figure 1 is a perspective view.

Figure 2:
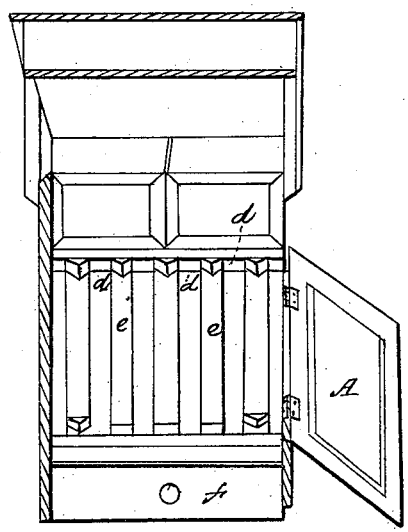

Figure 2, a rear elevation with the top propped back; and

Figure 3:
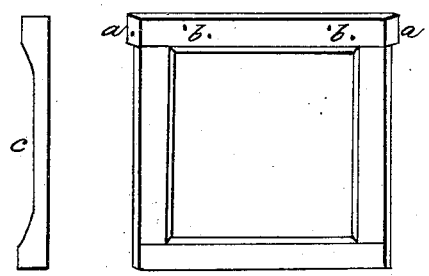

Figure 3 a view of the comb-frame and grooved strip, secured to the under surface of the top of the brood-chamber, in which the frames slide.

My improvement or invention consists in providing a movable comb bee-hive with an easy and ready method by which the comb-frames may be removed out of the hive without disturbing the honey-boxes.

To enable others skilled in the art to make and use my invention, I will proceed to describe its construction and operation.

I construct my bee-hive of square shape, as shown in fig. 1, closed at three sides and opened by a door in the rear which makes the fourth side, and is hinged to open and close, as shown in letter A, fig. 2. I divide the hive into two apartments, one above the other, by a horizontal partition, which serves as the top of the lower or brood-chamber, and as the bottom of the upper chamber on which the honey-boxes rest. I construct my comb-frames of square shape, with the upper piece projecting beyond the sides of the frames, and bevelled to a point or thin edge, as shown at $a\, a$, in fig. 3, to keep the body of the frames from coming in contact with the front or rear of the inside of the hive or case. I insert two pins through the top piece of the frames and allow them to project each side, as shown in red ink at $b\, b$, fig. 3, by which I suspend the frames in grooves in strips nailed to the under side of the top of the lower chamber. C, in fig. 3, exhibits these strips with the groove shown in red ink, and $d\, d$, in fig. 2, shows the ends of said strips in position in the hive, while $e\, e$, in fig. 2, shows the frames, which are removed by drawing them towards you out of the hive. The moth-trap is shown at $f$, fig. 2, which is a shallow drawer or box covered with wire cloth, and having a movable bottom. This drawer is shoved in from the rear of the hive, and has a hole or aperture to admit a tube which is inserted and fixed in from the front of the hive, immediately under the fly-holes or alighting-board, as shown at $g$, fig. 1, said tube projecting and extending into about the centre of the moth-drawer, serving also to ventilate the hive.

*Claim.*

What I claim as new, and desire to secure by Letters Patent, is—

1. The grooved strips $d\, d$, in combination with the comb-frames $e\, e$, substantially as arranged for the purpose and in the manner specified.

2. I also claim the box $f$ and tube $g$, combined, arranged, and operating in the manner and for the purpose set forth.

SOLOMON STEVENS.

Witnesses:
 JOEL HARRIS,
 JOHN SHROP.